United States Patent [19]

Minnick et al.

[11] Patent Number: 4,821,058
[45] Date of Patent: Apr. 11, 1989

[54] CAMERA WITH FLASH RESPONSIVE FOCUS SYSTEM

[75] Inventors: John H. Minnick, Rochester; John E. Spencer, Geneseo; Peter S. Tisack, Hilton, all of N.Y.

[73] Assignee: Eastman Kodak Company, Rochester, N.Y.

[21] Appl. No.: 144,839

[22] Filed: Jan. 15, 1988

[51] Int. Cl.⁴ .................................................. G03B 3/00
[52] U.S. Cl. .................................. 354/400; 354/402; 354/403
[58] Field of Search ............... 354/400, 401, 402, 403, 354/404, 405, 795.1

[56] References Cited

U.S. PATENT DOCUMENTS

| 3,128,168 | 4/1964 | Guenther et al. | 95/64 |
|---|---|---|---|
| 3,296,949 | 1/1967 | Bounds | 95/11 |
| 3,598,031 | 8/1971 | Harvey | 95/11 |
| 3,618,499 | 11/1971 | Harvey | 95/45 |
| 3,643,577 | 2/1972 | Monachesi | 95/45 |
| 3,720,148 | 3/1973 | Harvey | 354/403 |
| 4,182,563 | 1/1980 | Biber et al. | 354/197 |
| 4,238,153 | 12/1980 | Imura | 354/195 |
| 4,293,206 | 10/1981 | Tokutomi et al. | 354/25 |
| 4,294,526 | 10/1981 | Nakagawa | 354/195.1 |
| 4,295,715 | 10/1981 | Breen | 354/400 |
| 4,313,654 | 2/1982 | Matsui et al. | 354/403 |
| 4,317,991 | 3/1982 | Stauffer | 354/403 |
| 4,360,258 | 11/1982 | Hashimoto | 354/435 |
| 4,362,372 | 12/1982 | Kiesel | 354/195 |
| 4,364,648 | 12/1982 | Kitai et al. | 354/25 |
| 4,395,101 | 7/1983 | Morimoto | 354/128 |
| 4,408,855 | 10/1983 | Imura et al. | 354/25 |
| 4,459,005 | 7/1984 | Harvey | 354/403 |
| 4,473,285 | 9/1984 | Winter | 354/403 |
| 4,477,168 | 10/1984 | Hose | 354/403 |
| 4,483,603 | 11/1984 | Metabi et al. | 354/402 |
| 4,494,847 | 1/1985 | Yamada | 354/403 |
| 4,545,665 | 10/1985 | Aihara | 354/402 |
| 4,576,460 | 3/1986 | Daitoku et al. | 354/195.1 |
| 4,582,411 | 4/1986 | Ohmura et al. | 354/403 |
| 4,643,554 | 2/1987 | Ogawa | 354/400 |
| 4,710,013 | 12/1987 | Wong | 354/419 |

FOREIGN PATENT DOCUMENTS 59-202437 11/1984 Japan.
59-204012 11/1984 Japan.
59-202416 11/1984 Japan.
61-203429 9/1986 Japan.

Primary Examiner—Russell E. Adams
Attorney, Agent, or Firm—James A. Smith

[57] ABSTRACT

A photographic camera includes a lens adjustable to different focus distances, means for supplying a flash illumination, and a rangefinder for indicating the distance to a subject as one of at least two zones. The camera is operable in a flash mode or a non-flash mode. A ratchet is provided defining at least three consecutive teeth connected to the lens, each one of the ratchet teeth defining a focus setting for the lens, the focus settings ranging from a relatively near focus setting to a relatively distant focus setting. A pawl is provided for engaging a selected one of the ratchet teeth to fix the focus of the lens at the focus distance associated with the selected ratchet tooth. Focusing means responsive to the rangefinder are provided for operating the pawl to select one of the two ratchet teeth defining the relatively more distant focus settings when the flash illumination is not supplied, and one of the two ratchet teeth defining the relatively nearer focus settings when the flash illumination is provided. Thus, at least one of the ratchet teeth defining a focus setting is shared in both the flash and non-flash modes of operation.

9 Claims, 7 Drawing Sheets

CAMERA WITH FLASH RESPONSIVE FOCUS SYSTEM

FIELD OF THE INVENTION

The subject invention is directed generally to a photographic camera and more specifically to an autofocus camera wherein the focus distance of the lens and the zone changeover distances indicated by a rangefinder are shortened upon the activation of a flash.

BACKGROUND OF THE INVENTION

In typical picture-taking scenarios, flash (or strobe) illumination is used for photographing relatively near subjects. A typical flash picture composition might comprise, for example, an indoor portrait. In contrast, non-flash scenarios might comprise subjects positioned at any distance from close up to infinity (i.e. a landscape).

In recognition of these generalities, it is known in the art to decrease the focus distance of a camera picture taking lens when a flash is enabled. U.S. Pat. Nos. 3,589,031 to Harvey (assigned to the assignee of the present invention) and 3,643,577 to Monachesi show cameras which operate thusly. In the Harvey patent, a fixed focus lens is provided for non-flash operations. When a flash is enabled, an auxiliary lens is positioned coaxially with the fixed focus lens to shorten the focus distance of the latter. The Monachesi patent shows a camera wherein the lens is focused by translation along the optical axis. In non flash operation, the lens is fixed to a relatively distant focus setting. When a flash is activated, the focus distance of the lens is shifted to a relatively closer focus setting. Both cameras, however, show somewhat dated technology, neither showing or suggesting the autofocus features popular with current consumers.

Japanese Kokai No. 59-204012 shows an autofocus camera including an adjustable focus lens and a strobe. A focusing mechanism is provided, including two separate ratchets and a pawl. Each of the ratchets includes a plurality of teeth, and each of the teeth define a focus setting for the lens. The teeth on the first of the ratchets are positioned for optimum focusing of the lens in the flash mode of operation, while the teeth on the second ratchet are positioned to provide optimum focusing of the lens in the non-flash mode of operation. A mechanism is provided for aligning the appropriate one of the ratchets with the pawl.

While the camera of Japanese Kokai No. 59-204012 functions to provide optimum focusing in both the flash and non flash modes of operation, it suffers from the disadvantages of complexity and costliness inherent in the use of the intricate focusing mechanism. More specifically, the use of multiple ratchets and a ratchet positioning relay add substantial expense and difficulty to the construction of such a camera.

Published Japanese Kokai No. 61-203429 shows an autofocus camera including a rangefinder for indicating the distance to a subject as one of two zones. The focus distance of the taking lens is set to one of two distances, depending on the indicated zone. When a built-in flash is activated, the change-over distance between the two zones is decreased. Concomitantly, the two focus settings for the lens are decreased. Thus, in the flash mode of operation, the autofocus camera functions to provide better focus at relatively closer distances.

The autofocus camera shown in Japanese Kokai No. 61-203429 suffers from the disadvantage of the inherent complexity of the mechanism shown for changing the focus settings of the lens. This mechanism requires two separate ratchet areas on a lens ring, two separate pawls, and two separate electro magnets for controlling the pawls. This 'doubling' of focus apparatus increases the complexity and cost of the autofocus camera.

Japanese Kokai No. 59-202416 shows an autofocus camera including a fixed focus lens and an auxiliary telephoto lens which can be pivoted onto the optical axis. As shown in FIGS. 6–8 of this Kokai, a mechanism including a pawl and ratchet wheel is provided for focusing the telephoto lens at one of two focus distances, these distances being different in the flash mode of operation in comparison to the non flash mode of operation. As shown in FIG. 6, the ratchet wheel includes 3 consecutive teeth, each defining a discrete focus distance. In the non flash mode of operation, the focus setting for the lens is selected from between the first (one of the middle distance settings) and third (most distant) ratchet teeth. In the flash mode of operation, the focus setting for the lens is selected from between the 'cocked' lens position (before the first ratchet tooth—the closest distance setting), and the second ratchet tooth (one of the middle distance settings). Thus, a single ratchet and pawl are used to provide two lens focus settings in both the flash and non-flash mode of operation.

Japanese Kokai No. 59-202416 suffers from the disadvantage of being limited in distance settings. More specifically, because the focus settings used in the flash and non-flash modes of operation are mutually exclusive, to provide more focus settings in each mode would require an inordinate number of ratchet teeth. Thus, the apparatus described in this Kokai is inherently limited in the number of focus settings available.

Japanese Kokai No. 59-202437 shows a single lens autofocus camera, including a single ratchet and pawl mechanism for selecting focus distance settings in a manner for selecting focus distance settings in a manner functionally equivalent to that described above with respect to Kokai No. 59-202416. While the former Kokai uses a single lens and a slightly different mechanical mechanism to effect focusing, it suffers from the same disadvantages inherent in the use of mutually exclusive focus settings for the flash and non-flash modes of operation.

SUMMARY OF THE INVENTION

A principal object of the present invention is to provide an autofocus camera which permits optimal focusing in both flash and non-flash modes of operation and which is not subject to the disadvantages and limitations of the background art.

A more specific object of the present invention is to provide an autofocus camera having at least one near focus setting for a variable focus lens which is selectable by a rangefinder only in a flash mode of operation, at least one distant focus setting selectable only in the non-flash mode of operation, and at least one middle focus setting selectable in both the flash and non-flash modes of operation.

A new and improved camera is provided including a lens adjustable to different focus distances. Means are provided for supplying a flash illumination, and a rangefinder is provided for indicating the distance to a subject as one of at least two zones. The camera is operable in a flash or a non-flash mode of operation.

In accordance with the present invention, a ratchet is provided defining at least three consecutive teeth connected to the lens, each one of the ratchet teeth defining a focus setting for the lens, the focus settings ranging from a relatively near focus setting to a relatively distant focus setting. A pawl is provided for engaging a selected one of the ratchet teeth to fix the focus of the lens at the focus distance associated with the selected ratchet tooth. A focusing means responsive to the rangefinder is provided for operating the pawl to select one of the two ratchet teeth defining the relatively more distance focus settings when the flash illumination is not supplied and one of the two ratchet teeth defining the relatively nearer focus settings when the flash illumination is supplied. Thus, at least one of the ratchet teeth defining a focus setting is shared in both the flash and non-flash modes of operation.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DETAILED DESCRIPTION OF THE INVENTION

Figure 1:
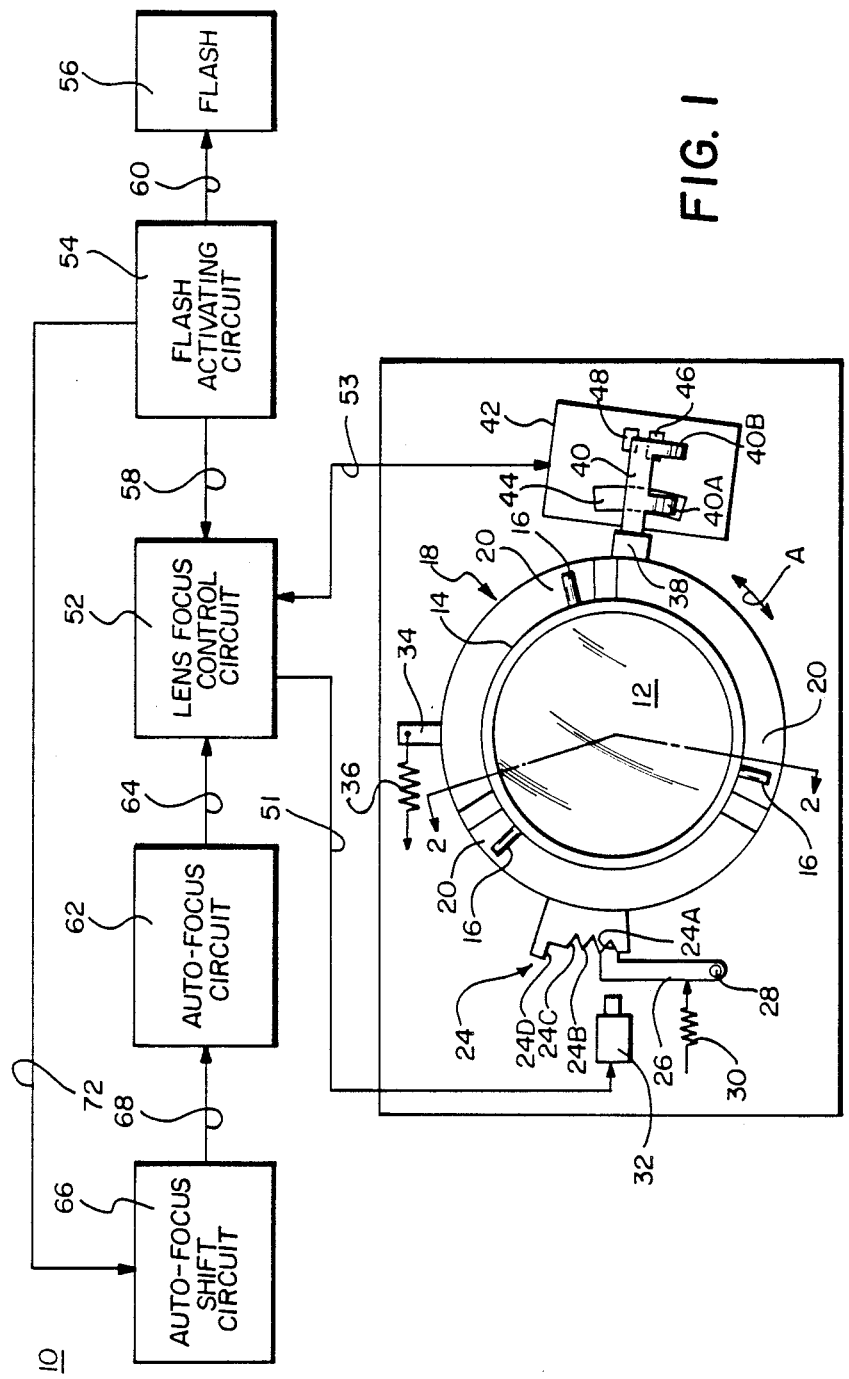
FIG. 1 is a front view, partly in schematic, of a camera constructed in accordance with the present invention.
Figure 2:
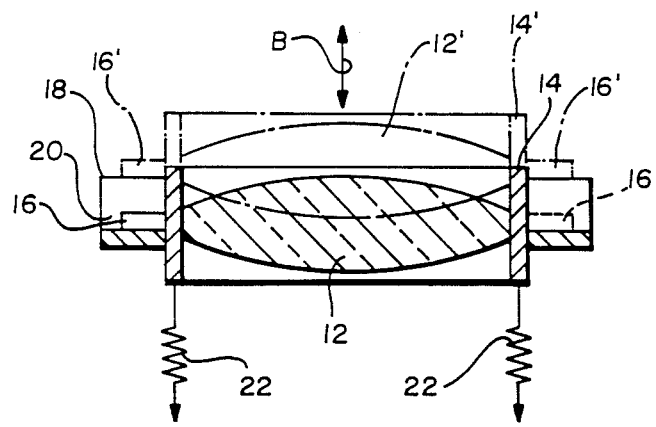
FIG. 2 is a sectional view taken along line 2—2 of FIG. 1.

Referring now to the drawings, FIGS. 1 and 2 show a camera 10 including a lens 12 for imaging objects (not shown) onto a photosensitive medium (also not shown). Lens 12 is supported in a sleeve 14, the sleeve including three equidistantly spaced ramp follower pins 16 extending perpendicularly therefrom. Sleeve 14 is supported, via pins 16, by a focusing ring 18. Ring 18 includes three identical ramp portions 20, each of the ramp portions extending slightly less than one-third of the way about the circumference of the ring. The three ramp portions 20 are disposed substantially perpendicular to pins 16, each pin 16 setting on a corresponding one of the said portions. Sleeve 14 is fixed against rotational motion, relative to ring 18, with a spring mechanism 22 shown schematically in FIG. 2. A rotational motion of ring 18, indicated by arrow A in FIG. 1, is thus translated into a linear motion of sleeve 14, indicated by arrow B in FIG. 2. FIG. 2 shows sleeve 14 at two extremes of linear movement, a near focus setting extreme indicated by the solid line representation 14, and a far focus setting extreme indicated by the dashed line representation 14'.

Disposed at a first location on the circumferential surface of ring 18 is a notched focus shift member (ratchet) 24. Shift member 24 includes three contiguous notches (teeth), indicated at 24A, 24B, and 24C, and a stop projection indicated at 24D. A toothed lever 26, comprised of magnetically attractive material such as iron, is shown engaging notch 24A of focus shift member 24, the lever being normally biased for rotation in a clockwise direction about a pivot 28 by a biasing spring 30. An electromagnet 32 is positioned adjacent lever 26 for controlling the motion of the lever by magnetic attraction.

Disposed at a second location on the circumferential edge of ring 18 is a first bracket 34 connected to a spring 36 for biasing the ring to rotate in a counterclockwise direction. Disposed at a third location on the circumferential edge of ring 18 is a second bracket 38 supporting a wiper 40 of electrically conductive material such as copper. Underlying wiper 40 is an electrically insulative circuit board 42 supporting an elongate, electrically conductive strip 44, and two, spaced, electrically conductive pads 46, 48, respectively. Wiper 40 includes an arm 40A in continuous electrical contact with strip 44, and an arm 40B which makes selective electrical contact with pads 46, 48 or regions of circuit board 42 there-about. Circuit board 42 is situated relative to focus shift member 24 such that when lever arm 26 engages notches 24B, 24C, respectively, wiper prong 40B is in electrical contact with pads 46, 48, respectively. When lever 26 engages notch 24A or abuts against stop 24D, wiper prong 40B makes contact with the electrically insulating surface of circuit board 42.

Continuing to describe FIGS. 1 and 2, a lens focus control circuit 52 is connected to electromagnet 32 and circuit board 42 via electrical connectors 51, 53, respectively. A flash activating circuit 54 is connected to lens focus control circuit 52 and to a flash 56 by electrical connectors 58, 60, respectively. An auto-focus circuit 62 is connected to lens focus control circuit 52 by an electrical connector 64, the auto focus circuit in turn being connected to an auto focus shift circuit 66 by an electrical connector 68. Auto focus shift circuit 66 is connected to flash activating circuit 54 by an electrical connector 72. It will be understood that the various electrical connectors shown in FIG. 1 may represent multiple electrical conductors or conductors conducting multiple signals as will be described in detail hereinbelow.

Flash 56 preferably comprises a standard, capacitively charged, electronic strobe circuit. Such a circuit is shown and described in U.S. Pat. No. 4,361,389 to Monks et al. (assigned to the assignee of the present invention), the entirety of which is incorporated herein by reference. Electromagnet 32 comprises, for example, one of many commercially available holding coils.

Flash activating circuit 54 preferably comprises an ambient light sensing circuit, which functions to sense the magnitude of the ambient light in a photographic scene and to activate flash 56 when this ambient light is determined to be below a predetermined threshold. Such a circuit is also shown and described in detail in the above cited Monks et al. patent, and comprises a feature commonly known as SENSALITE on Kodak cameras. SENSALITE is a registered trademark of Eastman Kodak Co. The details of auto focus shift circuit 66, auto focus circuit 62, and lens focus control circuit 52 will be described in detail below.

Figure 4:
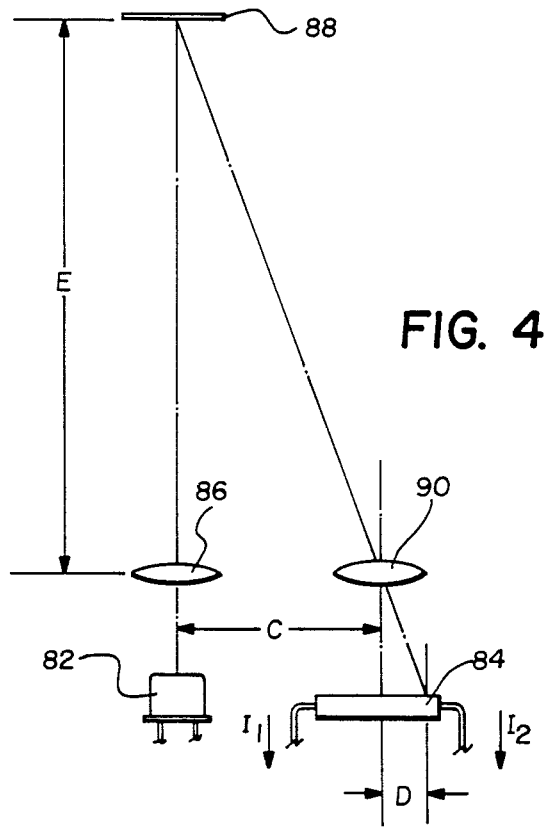
FIG. 4 is a schematic view illustrating the theory of triangulation rangefinding with particular reference to the operation of position sensing device of FIG. 3.
Figure 3:
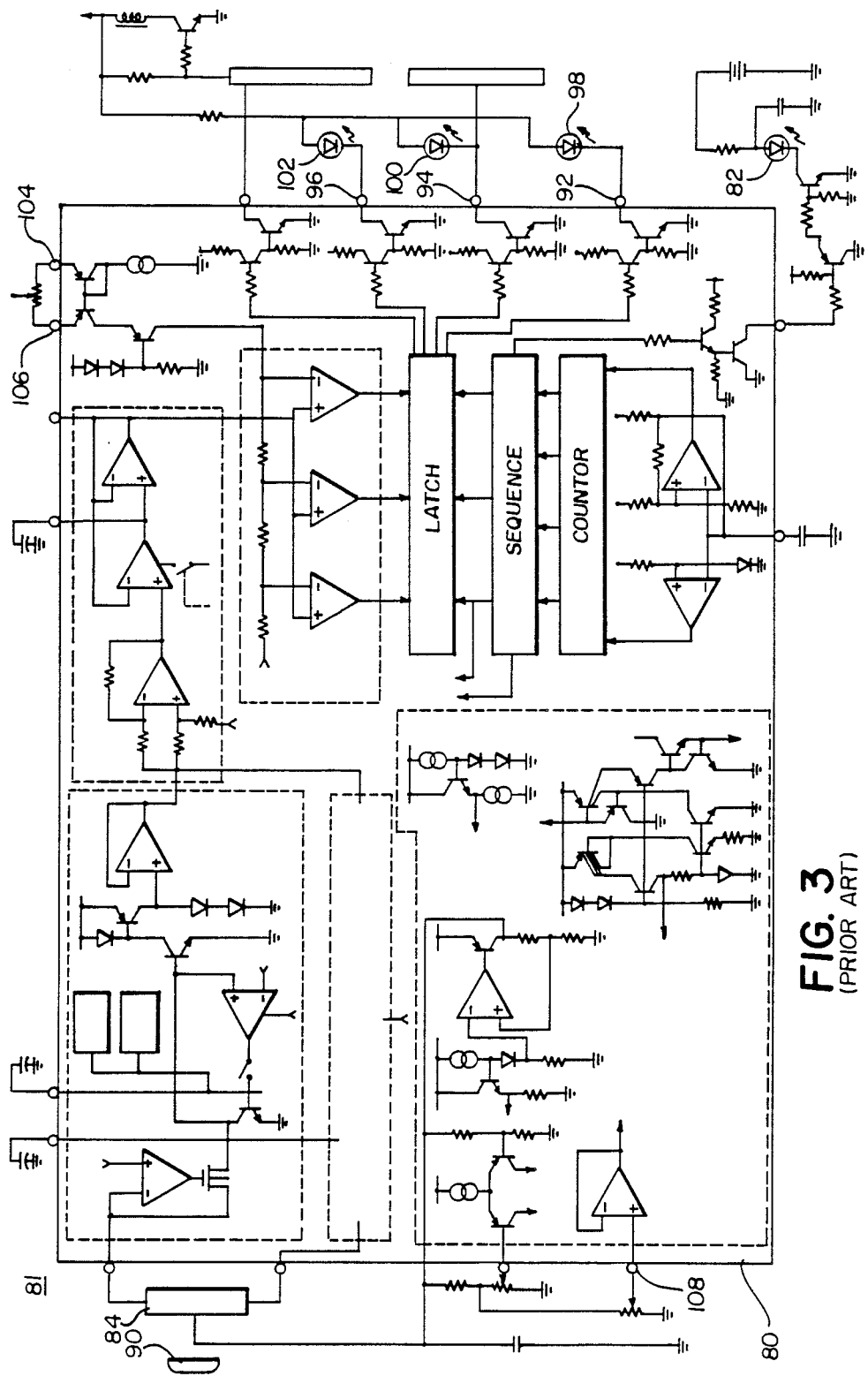
FIG. 3 is a schematic illustration of a commercially available near infrared rangefinder for use with the present invention.

Referring now to FIGS. 3 and 4, FIG. 3 illustrates an auto focus module 80 connected in an auto-focus circuit 81 in a manner known in the art. Auto-focus module 81 comprises an H2152 integrated circuit, commercially available from the Hammamatsu Corp., and is connected in auto-focus circuit 81 in a manner taught by the manufacturer's technical bulletins. Technical data being readily available from the manufacturer, only a basic description of the operation of module 80 will be provided herein. It will be understood that auto-focus circuit 81 comprises a "typical", known implementation of auto-focus module 80, in contrast to the inventive autofocus circuit 62 shown in block diagram in FIG. 1 and described in detail with respect to FIG. 5 below.

Describing the commercially known auto-focus circuit 81, module 81 is typically connected for use with a near-infrared light emitting diode (LED) 82, and a position sensing device (PSD) 84. LED 82 comprises, for example, a model no. L2204, while PSD 84 comprises, for example, a model no. S2153-01, both models being available through the Hammamatsu Corp.

As shown in FIG. 4, LED 82 and PSD 84 are typically mounted in a camera body (not shown) at a fixed distance C relative to the centers of each device. A lens 86 is provided for focusing the near-infrared radiation emitted by LED 82 onto an object 88. A second lens 90 is provided for focusing the near-infrared radiation reflected from object 88 onto PSD 84. The distance D between the center of PSD 84 and the point of incidence of the reflected radiation beam is determined as a function of the ratio of currents $I_1$ and $I_2$. In a manner well known to those skilled in the art, distances C and D are subsequently used to determine the distance E to object 88.

Auto-focus circuit 81 classifies the distance E as falling into one of three zones: a far zone for objects in a far range of distances, a middle zone for objects in a middle range of distances, and a near zone for objects in a near range of distances. These far, middle, and near zones are indicated by electrical signals on module pins 17, 18, and 19, the pins being indicated at 92, 94, and 96, respectively. Module 80 normally outputs an open collector output signal on pins 92, 94, 96, with the pin indicative of the zone including distance E going to a low voltage signal. It will be appreciated that module 80 is implemented in BIMOS logic, and that a low voltage signal is typically 0.5 volts, while a high voltage signal is typically 3.0 volts. In the typical configuration shown in FIG. 3, pins 92, 94, 96 are connected to actuate LED's 98, 100, 102, respectively, whereby to indicate visually to a user the zone including the distance E.

Module 80 further provides pins for supplying calibrating voltages to auto-focus circuit 62, these pins including 4, 5, and 15, indicated at 104, 106 and 108, respectively. The voltage applied to pins 104, 106, respectively, are used to calibrate the range of distances constituting the near, middle and distant zones, while the voltage applied to pin 108 operates to linearly expand or compress the distances between centers of adjacent zones. As shown in FIG. 3, the voltages normally supplied to pins 104, 106, 108 are provided by voltage divider circuits employing variable resistors. Because the normal method and apparatus used for calibrating auto-focus circuit 62 is well known in the art, and available from the manufacturer, it will not be discussed in detail herein. The use of these calibrating voltages in accordance with the present invention, however, is discussed in detail hereinbelow. It will be appreciated by those skilled in the art that auto-focus circuit 81 comprises what is typically referred to in the art as an infra-red rangefinder.

Figure 5:
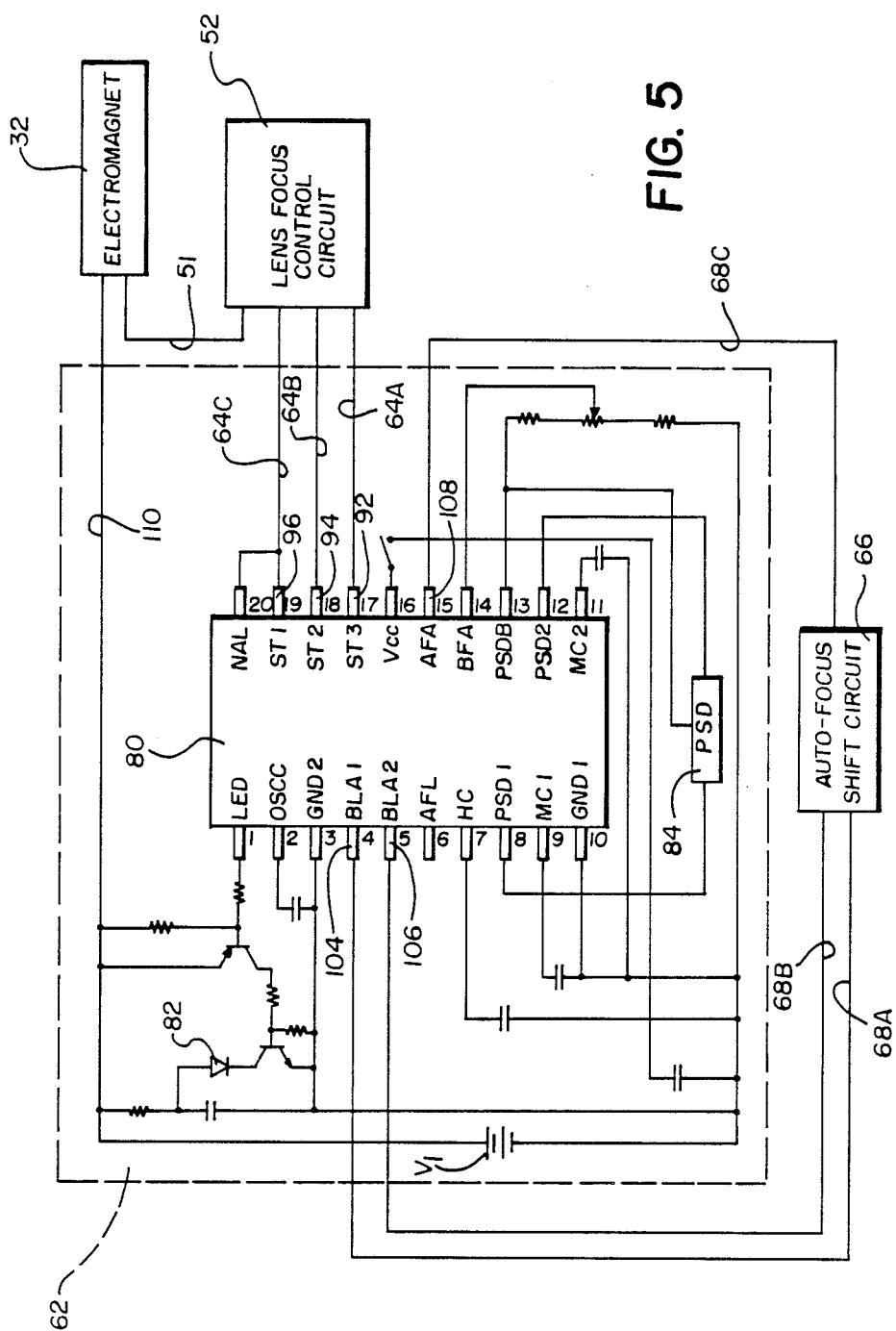
FIG. 5 is a schematic view showing the rangefinder of FIG. 3 utilized in accordance with the present invention.

Referring now to FIG. 5, auto-focus circuit 62 is shown incorporating module 80 and constructed in accordance with the present invention. As described in FIG. 4 above, auto-focus circuit 62 includes LED 82 and PSD 84 connected to module 80 in the manner described above. In accordance with the present invention, auto focus shift circuit 66 is connected to pins 104, 106, 108 of module 80 via conductors 68A, 68B, 68C, respectively. Lens focus control circuit 52 is connected to pins 92, 94, 96 of module 80 via conductors 64A, 64B, 64C, respectively, thereby replacing (or being parallel-connected with) LED's 98, 100, 102 (FIG. 4). Electromagnet 32 is connected to the positive terminal of a voltage source $V_1$ via a conductor 110. It will be understood that the connection of electromagnet 32 to voltage source $V_1$ is a matter of convenience, and that no electrical signals are exchanged between the electromagnet and auto-focus circuit 62.

Figure 6:
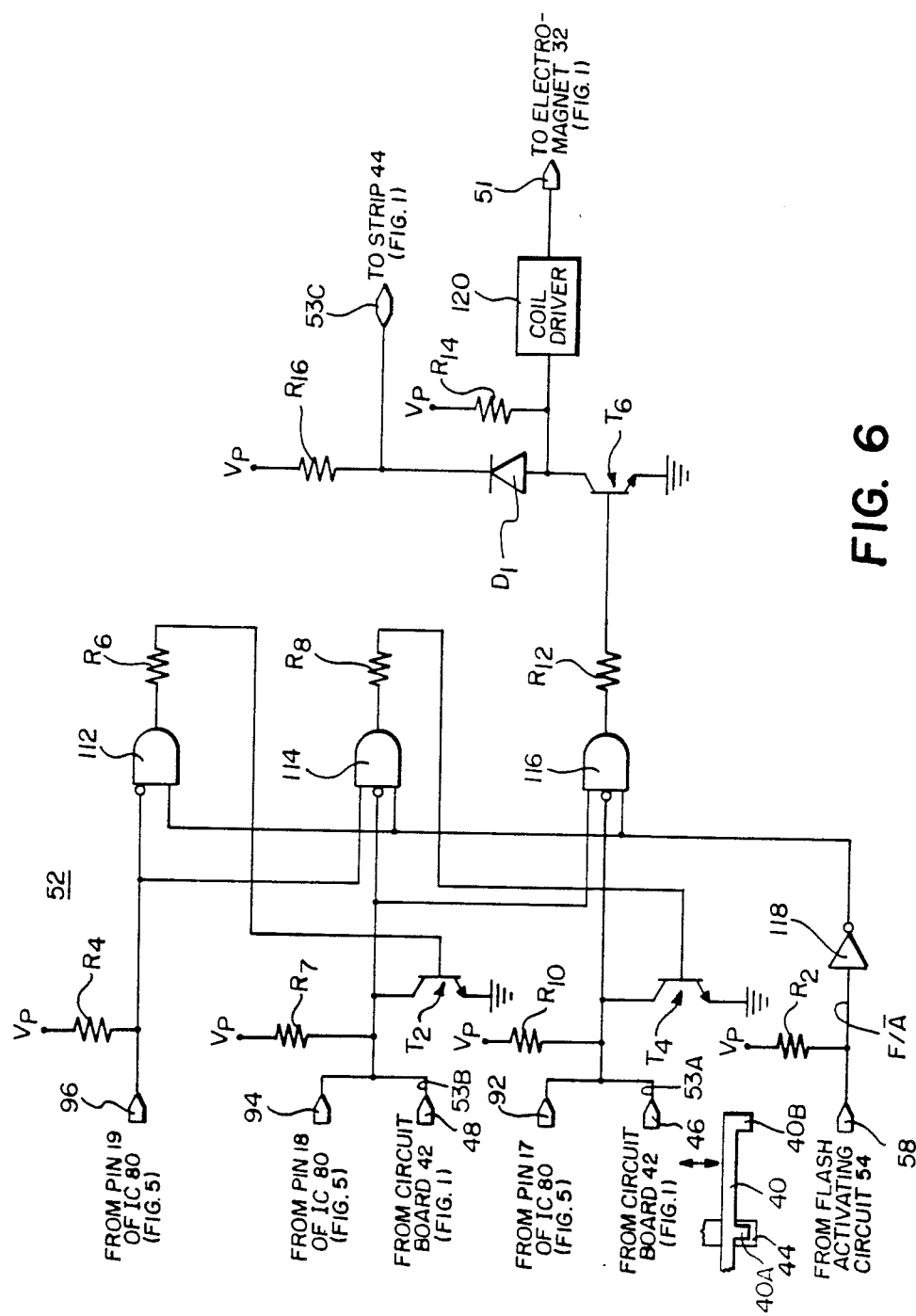
FIG. 6 is a schematic view of the lens focus control circuit of FIGS. 1 and 5.

Referring now to FIG. 6, lens focus control circuit 52 comrpises three logical AND gates indicated respectively at 112, 114, and 116, and an inverter 118. Inverter 118 receives its input from conductor 58 of flash activating circuit 54, which is connected with a pull up voltage $V_P$ through a resistor $R_2$. The signal input to inverter 118 by conductor 58 constitutes either a high voltage signal, representing a flash mode of operation and indicated by the letter F, or a low voltage signal, representing an ambient mode of operation and indicated by the letter A-bar. The output of inverter 118 is connected to a first, non-inverted input of each of gates 112, 114, and 116. For purposes of explanation, all pull-up voltage connections in FIG. 6 are represented by the indicator $V_P$.

The remaining, inverting input to gate 112 is connected with output 96 of module 80, pull-up resistor $R_4$, and a second, non-inverting input to gate 114. The output of gate 112 is connected to the remaining, inverting input of gate 114 through a resistor $R_6$, and through a base-collector path of an NPN resistor $T_2$. The inverting input of gate 114, in addition to being connected with the collector of transistor $T_2$, is further connected with a pull-up resistor $R_7$, the second, non-inverting input of gate 116, the output 94 of module 80 (FIG. 5), and the pad 48 (via a connector 53B) of circuit board 42 (FIG. 1).

The output of gate 114 is connected to the remaining, inverting input of gate 116 through a resistor $R_8$ and a base-collector path of an NPN transistor $T_4$. The inverting input of gate 116, in addition to being connected with the collector of transistor $T_4$, is further connected with a pull-up resistor $R_{10}$, output 92 of module 80 (FIG. 5), and pad 46 (via a connector 53A) of circuit board 42 (FIG. 1).

The output of gate 116 is connected through a resistor $R_{12}$ to the base of an NPN transistor $T_6$. The collector of transistor $T_6$ is connected in common with a cathode of a diode $D_1$, a pull-up resistor $R_{14}$, and the input to a coil driver element 120. The output of coil driver 120 is connected to electromagnet 32 (FIG. 1) via conductor 51.

The anode of diode $D_1$ is connected in common with a pull-up resistor $R_{16}$ and to strip 44 (FIG. 1) via conductor 53C. Wiper 40 (FIG. 1), including prongs 40A, 40B, is shown schematically in FIG. 6 proximate pads 46, 48. As will be apparent from a consideration of FIGS. 1 and 6, wiper 40 is adapted for to selectively contact pads 46 or 48 with prong 40B while maintaining constant contact with strip 44 via prong 40A. It will be understood that, when wiper 40 is situated so as not to contact pads 46 or 48 (i.e. therebetween, or to one side), prong 40B is in contact with the electrically insulating surface of circuit board 42.

Lens focus control circuit 52 is preferably constructed in $I^2L$ logic, a logic type compatible with module 80 (FIG. 4) and with the voltage typically supplied by a 6.0 volt camera battery.

For ease of understanding, the operation of camera 10 will now be described with respect to the elements heretofore described. It will be appreciated that this includes all elements with the exception of auto-focus shift circuit 62, the structure and operation of which will be described in detail hereinbelow.

The operation of camera 10 is initialized before each picture-taking event with lever 26 situated in notch 24A of focus shift member 24, whereby lens 12 is focused at its furthest distance setting. Such initialization is well known to those skilled in the art, and is not described in detail herein. Upon the pressing of a shutter release button (not shown) by a user (also not shown), electromagnet 32 is energized so as to magnetically attract the toothed end of lever 26 and disengage the lever from focus shift member 24. Lens 12 is thus permitted, in accordance with the bias provided by spring 36, to rotate in a counter-clockwise direction (as viewed in FIG. 1) towards a nearer focus setting. The activation of electromagnet 32 in response to the activation of a shutter release button is well known in the art, and not shown in detail herein.

For purposes of explanation, it will first be assumed that camera 10 is in the ambient, non-flash mode of operation, and that the input to inverter 118 comprises the low voltage signal A-bar. As described above, this mode of operation occurs when flash activating circuit 54 determines that the ambient light in a picture scene is above a predetermined threshold and sufficient such that additional light from flash 56 is not required to provide an adequate exposure. It will also be assumed that object 88 has been determined to be in the far zone, output 92 of module 80 thus going low. Examining the state of gate 116, it will be seen that the input from inverter 118 is high. Pad 92 is low (indicating that object 88 is in the far zone) and pad 46 is low (wiper 40 being spaced from pads 46, 68), making the inverted input of gate 116 low (thus appearing high to the gate). Output 94 of module 80 is normally high, and thus the remaining, non-inverting input of gate 116 is high. Because all of the inputs to gate 116 are high, the output goes high and turns on transistor $T_6$. With transistor $T_6$ on, the current from pull-up resistor $R_{14}$ is sunk to ground through transistor $T_6$, and coil driver 120 is disabled. Electromagnet 32 is thus disabled, and lever 26 falls immediately back into notch 24A, maintaining lens 12 at its most distant focus setting for the duration of the exposure.

Next is is assumed that camera 10 is in the ambient mode of operation, but that object 88 is at a middle distance zone. Examining gate 116, it will be seen that pad 92 and hence its inverted input is high, maintaining the output of gate 116 low and transistor $T_6$ off. When the shutter release button (not shown) is activated, electromagnet 32 turns on to attract lever 26 and permit lens 12 to rotate as described above. As is apparent from a consideration of FIGS. 1 and 6, wiper 40 begins to wipe across the surface of circuit board 42 towards pads 46, 48, respectively. Examining gate 114, it will be seen that the input from inverter 118 is high, the inverted input is low (thus appearing high) because output 94 from module 80 is low (indicating object 88 is in the middle zone), and the remaining input is high because output 96 from module 80 is normally high. With all three inputs high, the output of gate 114 is high and transistor $T_4$ is turned on. When wiper 40 makes electrical contact with pad 46, the input to coil driver 120 is grounded through diode $D_1$ and transistor $T_4$, inactivating electromagnet 32 and permitting lever 26 to engage tooth 24B of focus shift member 24. Lens 12 is thus held in focus at the middle zone for the ambient mode of operation.

In like manner as described above, when auto-focus circuit 62 determines that object 88 is in the near zone, transistor $T_4$ and $T_6$ are off, the output of gate 112 is set high, and transistor $T_2$ turns on. When the shutter release button is activated, lens 12 rotates in a counterclockwise direction, moving wiper 40 until prong 40B makes contact with pad 48, at which point the coil driver 120 is inactivated releasing lever 26 to stop the motion of the lens. Lens 12 is thus maintained at the near zone for the ambient mode of operation In summary, the engagement of lever 26 with notches 24A, 24B, and 24C represent the far, middle, and near focus settings for lens 12, respectively, in the ambient light mode of operation of camera 10. The exact distances comprising the near, middle, and far zones will be discussed in detail hereinbelow.

Having described the operation of camera 10 in the ambient light mode of operation, the operation will now be described with respect to the flash mode of operation: i.e. wherein flash activating circuit 54 has determined the ambient light is below a predetermined threshold and has activated flash 56 to obtain an adequate exposure.

In the flash mode of operation, the input to inverter 118 goes to a high voltage signal F, and the output goes low. The low output of inverter 118 disables gates 112, 114, and 116. Because gates 112, 114, and 116 are disabled, their outputs remain low and transistors $T_2$, $T_4$, and $T_6$ remain off. As described above, outputs 92, 94, and 96 of module 80 are normally high, one output going low to indicate the zone including the distance E to object 88.

Assuming first that distance E is situated in the far zone as determined by auto-focus circuit 62, output 92 goes low. When the shutter release button of camera 10 is activated, and lens 12 begins to rotate counter-clockwise towards a nearer focus setting, wiper 40 engages pad 46 on circuit board 42. Because output 92 of module 80 is low, the current supplied to coil driver 120 is sunk through module 80 to ground along a path including diode $D_1$, conductor 53C, strip 44, wiper 40 and pad 46. Coil driver 120 is thus inactivated, permitting lever 26 engage notch 24B of shift focus control member 24, halting the motion of lens 12. It is thus seen that the far focus setting in the flash mode of operation is the same as the middle focus setting in the ambient mode of operation.

Assuming next that distance E is determined by auto focus circuit 62 to be in the middle zone, the operation of camera 10 will be essentially identical to that described immediately above, with the exception that the motion of lens 12 will be stopped when wiper 40 makes electrical contact with pad 48. At that time lever 26 is released to engage notch 24C of focus shift member 24, stopping the motion of lens 12. It is thus seen that the middle focus setting in the flash mode of operation is the same as the near focus setting in the ambient mode of operation.

When distance E is in the near zone, both pads 46, 48 are high and electromagnet 32 remains energized throughout the mechanical range of motion of lens 12. The counter clockwise rotation of lens 12 is stopped only when stop projection 24D of focus shift control member 24 engages the tooth of lever 26 as the lever is held by electromagnet 32. Thus, the near zone in the flash mode of operation is at a closer focus setting than it is possible to obtain in the ambient mode of operation described hereinabove.

To briefly summarize the function of camera 10 as described above, three contiguous focus settings are provided for both the ambient and flash modes of operation. The focus settings in the flash mode are relatively closer (i.e. one notch on focus shift member 24) than the focus settings in the ambient mode. The focus settings in the flash and non-flash modes of operation share in common two focus settings, those defined by projections 24B, 24C. Further, the maximum focus setting in the flash mode is decreased from the maximum focus setting in the ambient mode, while the near focus setting in the flash mode is closer than any available focus setting in the ambient mode.

Figure 7:
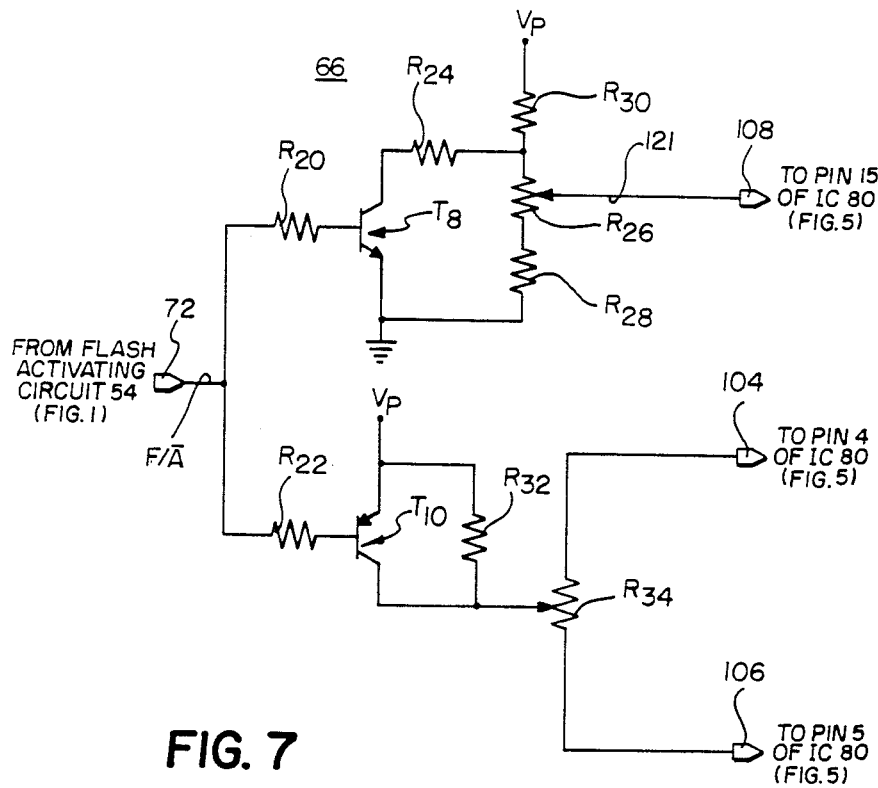
FIG. 7 is a schematic view of the auto-focus shift circuit of FIGS. 1 and 5.

Referring now to FIG. 7, auto-focus shift circuit 66 is seen to comprise an NPN transistor $T_8$ and a PNP transistor $T_{10}$. The base of transistor $T_8$ is connected to conductor 72 through a resistor $R_{20}$, while the base of transistor $T_{10}$ is connected to the same conductor through a resistor $R_{22}$. The collector and emitter of transistor $T_8$ are connected through series connected resistors $R_{24}$, $R_{26}$, and $R_{28}$, respectively. The junction of resistors $R_{24}$ and $R_{26}$ are connected to pull up voltage $V_P$ via an intermediately disposed resistor $R_{30}$. Resistor $R_{26}$ comprises a variable resistor, the variable output thereof being connected to pin 108 via a wiper 121.

Continuing to describe FIG. 7, the emitter and collector of transistor $T_{10}$ are connected through a resistor $R_{32}$. The junction of the collector of transistor $T_{10}$ and resistor $R_{32}$ is connected to the wiper of a variable resistor $R_{34}$. The junction of the emitter of transistor $T_{10}$ and resistor $R_{32}$ is connected to pull-up voltage $V_P$. The fixed ends of resistor $R_{34}$ are connected to pins 104, 106 (FIG. 5), respectively.

In operation, when camera 10 is in the ambient light mode (as determined by flash activating circuit 54), conductor 72 is low. Transistor $T_8$ is off, and the voltage on pin 108 is determined by current through $R_{26}$, $R_{28}$, $R_{30}$. Transistor $T_{10}$ is on, and the voltage on pins 104, 106 are determined by current through $R_{34}$.

Figure 8:
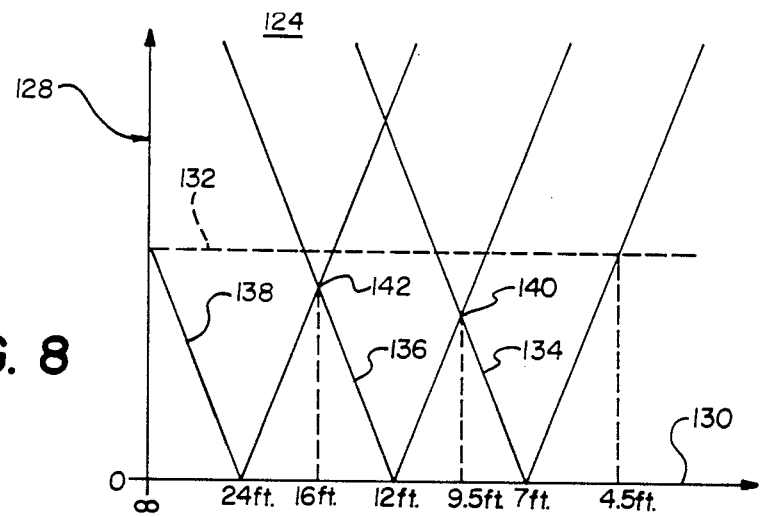
FIG. 8 is a graph illustrating the operation of a camera constructed in accordance with the present invention and operating in an ambient light mode of operation.

Referring now to FIGS. 7 and 8, the operation of autofocus circuit 62, as calibrated by autofocus shift circuit 66 in the ambient light mode of operation, is illustrated by graph 124. Graph 124 includes a vertical axis 128 representing blur in mils, and a horizontal axis 130 representing the distance in feet between object 88 and lens 12 of camera 10. The circle of blur is represented by dashed line 132, and the near, middle, and far zones are indicated by plots 134, 136, and 138, respectively. It will be understood that, for the purpose of describing the subject invention, the circle of blur is defined as the subjective, acceptable level of blur acceptable to the viewer. This circle of blur is typically in the range of 8–12.5 mils, depending on the subject distance and exposure level.

In accordance with the present invention, resistors $R_{20}$, $R_{24}$, $R_{28}$, and $R_{30}$ are selected to set the voltage on pin 108 such that, in the ambient mode of operation, near zone 134 extends from approximately 4.5–9.5 feet, middle zone 136 extends from 9.5–16 feet, and far zone 138 extends from 16 feet to infinity. It will be appreciated that the cross-over-points of the near/middle and middle/far zones, indicated at 140, 142, respectively, are well below the circle of blur. Further describing the ambient mode of operation illustrated by graph 124, resistors $R_{22}$, $R_{32}$, and $R_{34}$ are selected to set the voltages on pins 104, 106 such that the centers of near zone 134, middle zone 136, and far zone 138 comprise, respectively, approximately 7, 12, and 24 feet.

In operation, when camera 10 is in the flash mode (as determined by flash activating circuit 54), conductor 74 is high. Transistor $T_8$ is on, and the voltage on pin 108 is determined by the current through $R_{24}$, $R_{26}$, $R_{28}$, and $R_{30}$. Transistor $T_{10}$ is off, and the voltage on pins 104, 106 are determined by the current through $R_{32}$ and $R_{34}$.

Figure 9:
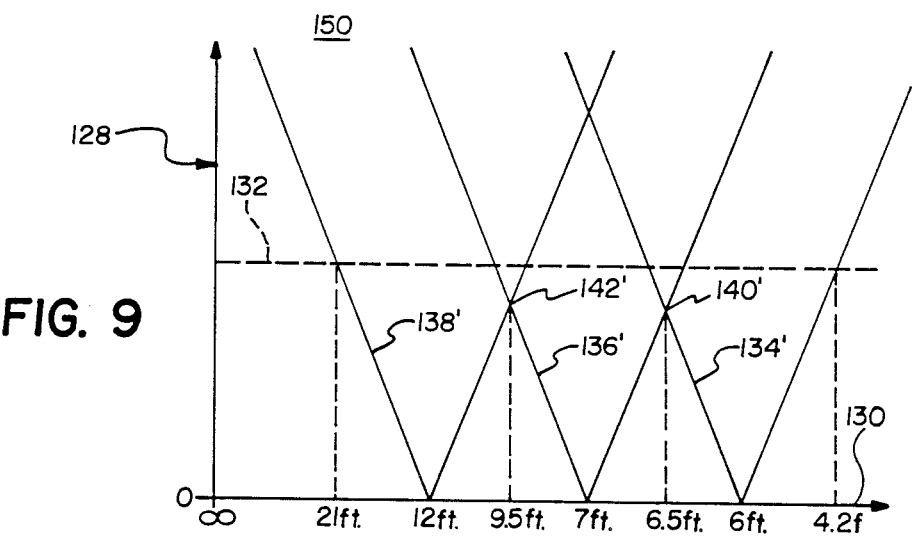
FIG. 9 is a graph illustrating the operation of a camera constructed in accordance with the present invention and operating in a flash mode of operation.

Referring now to FIGS. 7 and 9, the operation of autofocus circuit 62, as calibrated by autofocus shift circuit 66 in the flash mode of operation, is illustrated by graph 150. Graph 150 is identical to graph 124 (FIG. 8), with the exception of new plots 134', 136', 138' representative of the flash mode of operation. In accordance with the present invention, resistors $R_{20}$, $R_{24}$, $R_{28}$, and $R_{30}$ are selected to set the voltage on pin 108 such that, in the flash mode of operation, near zone 134' extends from approximately 4.2–6.5 feet, middle zone 136' extends from 6.5–9.5 feet, and far zone 138' extends from 9.5–21 feet. It will be appreciated that the cross-overpoints of the near/middle and middle/far zones, indicated at 140', 142', respectively, are well below the circle of blur. Further describing the flash mode of operation illustrated by graph 150, resistrs $R_{22}$, $R_{32}$, and $R_{34}$ are selected to set the voltages on pins 104, 106 such that the centers of near zone 134', middle zone 136', and far zone 138' comprise, respectively, approximately 6, 7, and 12 feet.

The voltages which must be applied to pins 104, 106, 108 to effect the above-described operation can be straight-forwardly determined from the information supplied by the manufacture. As a matter of example, to affect such voltages using the autofocus shift circuit as shown in FIGS. 7 and 8, resistors $R_{24}$ $R_{34}$ comrpise the following values, in ohms, respectively: 110K, 10K, 24K, 47K, 20K, and 5K.

Comparing FIGS. 8 (ambient mode of operation) and 9 (flash mode of operation), it will be seen that, in the flash mode of operation, the range of distances defining each zone is relatively shorter, and the centers of adjoining zones are relatively closer. Further, far zone 138' falls short of infinity in the flash mode of operation, flash 56 being incapable of illuminating an infinite distance.

Considering the operation of autofocus shift circuit 66 and lens focus control circuit 52, both described in detail above, it will be seen that either may be applied separately to improve the operation of camera 10. Lens focus control circuit 52 functions, in the flash mode of operation, to decrease the focus distance of lens 12 in the near, middle, and far zones, and hence to improve the focus and exposure obtained when flash 46 is activated. Auto-flash shift circuit 66 functions to decrease the distances comprising the focus zones as determined by autofocus circuit 62, accomplishing similar results.

It will be further seen that, when auto focus shift circuit 6 and lens focus control circuit 52 are operated together, they provide a synergistic effect producing substantially better operation of camera 10. The operation of camera 10, specifically with respect to its automatic focus, is in effect tailored to the ambient or flash modes of operation as selected by flash activating circuit 54. More specifically, in the flash mode of operation, the relative zone distances and the focus distance of lens 12 are simultaneously shortened. This permits camera 10 to provide better focus for near objects 88, near objects being more typical of the subjects comprising a flash picture composition. The focus of more distant objects is deemphasized in the flash mode of operation, such objects being less likely to be adequately illuminated. In the ambient mode of operation, however, the distances comprising the relative zones, as well as the focus of lens 12, are calibrated to provide the best available focusing out to a distance of infinity.

There is thus provided an improved autofocus camera which provides for optimum focus settings of an adjustable lens in both flash and non-flash modes of operation. The camera uses a straight forward, economical mechanism to provide this optimum focusing, the mechanism providing intermediate focus settings "shared" in both the flash and non-flash modes of operation. This sharing of focus settings in the two modes of operation permits the satisfactory number of focus settings to be provided by a single ratchet and pawl mechanism.

While a preferred embodiment of the invention has been illustrated and described, it will be clear that the invention is not so limited. Numerous modifications, changes, variations, substitutions, and equivalents will occur to those skilled in the art without departing from the spirit and scope of the present invention.

What is claimed is:

1. In a camera including a lens adjustable to different focus distances, means for supplying a flash illumination, and a rangefinder for indicating the distance to a subject as one of at least two zones, said camera operable in a flash mode or a non-flash mode, apparatus comprising:
   a ratchet defining at least three consecutive teeth connectible to said lens, each one of said ratchet teeth defining a focus setting for said lens, the focus settings ranging from a relatively near focus setting to a relatively distant focus setting;
   a pawl for engaging a selected one of said ratchet teeth to fix the focus of said lens at the focus distance associated with the selected ratchet tooth; and
   focusing means responsive to said rangefinder for operating said pawl to select one of the two ratchet teeth defining the relatively more distant focus settings when said flash illumination is not supplied and one of the two ratchet teeth defining the relatively nearer focus settings when said flash illumination is supplied;
   such that at least one of said ratchet teeth defining a focus setting is shared in both said flash and non-flash modes of operation.

2. Apparatus in accordance with claim 1 wherein the changeover point between the distance zones indicated by said rangefinder is decreased when said flash is activated.

3. Apparatus in accordance with claim 1 wherein said focusing means includes an electromagnet positioned to control the operation of said pawl.

4. Apparatus in accordance with claim 3 wherein said focusing means further comprises:
   means adjustable in position for varying the focus distance of said lens; and
   means connected to said electromagnet and responsive both to the position of said varying means and to said rangefinder for operating said electromagnet so as to cause said pawl to engage a selected rachet tooth.

5. Apparatus in accordance with claim 1 and further including means connected to said flash for automatically activating said flash when the ambient light magnitude is below a predetermined threshold.

6. In a camera including a lens adjustable to different focus distances, a flash, and a rangefinder for indicating the distance to a subject as one of at least three zones, said camera operable in a flash mode or a non-flash mode, apparatus comprising:
   a ratchet defining at least four consecutive teeth connectible to said lens, each one of said ratchet teeth defining a focus setting for said lens, the focus settings ranging from a relatively near focus setting to a relatively distant focus setting;
   a pawl for engaging a selected one of said ratchet teeth to fix the focus of said lens at the focus distance associated with the selected tooth, said pawl comprising a magnetizable material;
   a single electromagnet positioned for controlling the action of said pawl;
   means connected to said flash for automatically activating said flash when the ambient light in a photographic scene falls below a predetermined level;
   means responsive to said flash activating means and connected to said rangefinder for decreasing the changeover distances between the distance zones indicated by said rangefinder when said flash is activated;
   focusing means responsive to said rangefinder and to said flash activating means for operating said pawl to engage one of the three teeth defining the three relatively more distant focus settings when said flash is not activated and one of the teeth defining the three relatively nearer focus settings when said flash is activated;
   such that the two ratchet teeth defining the two mdidle focus settings can be selected in both said flash and non-flash mode of operations.

7. Apparatus in accordance with claim 6 wherein said focusing means comprises:
   a rotatable sleeve supporting said lens such that rotation of said sleeve varies the focus distance of said lens;
   a plurality of stationary electrical contacts fixed in position relative to said sleeve; and
   a movable electrical contact fixed to said rotatable sleeve and positioned to engage selected ones of said stationary electrical contacts dependant on the position of said rotatable sleeve.

8. Apparatus in accordance with claim 7 wherein said focusing means further comprises electrical circuit means connected to said rangefinder, said stationary electrical contacts, said electromagnet, and said movable electric contact, for sensing the zone indicated by said rangefinder and the focus distance of said lens, and for operating said electromagnet to cause said pawl to engage the ratchet tooth defining the focus distance appropriate for the zone indicated by the rangefinder.

9. Apparatus in accordance with claim 8 wherein said electrical circuit means is further connected to said means for automatically activating said flash.

* * * * *

UNITED STATES PATENT OFFICE
CERTIFICATE OF CORRECTION

PATENT NO. : 4,821,058
DATED : April 11, 1989
INVENTOR(S) : J. Minnick, J. Spencer, P. Tisack It is certified that error appears in the above-identified patent and that said Letters Patent is hereby corrected as shown below:

| | |
|---|---|
| Column 3, line 14 | "distance" should be --distant-- |
| Column 4, line 1 | delete "the". Insert --ramp-- after "said" |
| Column 5, line 12 | "81" (second occurrence) should be --80-- |
| Column 5, line 25 | "81" (second occurrence) should be --80-- |
| Column 6, line 32 | "comrpises" should be --comprises-- |
| Column 8, line 65 | after "26" insert --to-- |
| Column 10, line 25 | "74" should be --72-- |
| Column 10, line 55 | "comrpise" should be --comprise-- |
| Column 11, line 5 | "46" should be --56-- |
| Column 11, line 6 | "Auto-flash" should be --Auto-focus-- |
| Column 11, line 10 | "6" should be --66-- |
| Column 12, line 55 | "mdi-" should be --mid-- |

Signed and Sealed this

Sixteenth Day of January, 1990

*Attest:*

JEFFREY M. SAMUELS

*Attesting Officer*   *Acting Commissioner of Patents and Trademarks*